United States Patent [19]

Yachida et al.

[11] Patent Number: 4,648,104

[45] Date of Patent: Mar. 3, 1987

[54] PULSE COUNTING AND PULSE RATE INDICATING DEVICE RESPONSIVE TO ABRUPT PULSE RATE CHANGE TO ACCURATELY INDICATE CURRENT RATE

[75] Inventors: Yoichi Yachida, Nagaoka; Masaya Yoneyama, Koshijimachi, both of Japan

[73] Assignee: Nippon Seiki Corporation, Nagaoka, Japan

[21] Appl. No.: 647,522

[22] Filed: Sep. 5, 1984

[30] Foreign Application Priority Data

Sep. 27, 1983 [JP] Japan .................................. 58-178723
Oct. 27, 1983 [JP] Japan .................................. 58-201727

[51] Int. Cl.⁴ .............................................. G01P 3/60
[52] U.S. Cl. ...................................... 377/54; 377/20; 377/59; 324/166; 364/565
[58] Field of Search ................... 377/54, 23, 70, 75, 377/24; 324/166; 364/565

[56] References Cited

U.S. PATENT DOCUMENTS

| | | |
|---|---|---|
| 3,909,714 | 9/1975 | Nakano . |
| 3,936,663 | 2/1976 | Taylor et al. .......................... 324/166 |
| 4,158,172 | 6/1979 | Boyer et al. .......................... 324/166 |
| 4,281,388 | 7/1981 | Friend et al. .......................... 324/166 |
| 4,430,612 | 2/1984 | Onitsuka et al. ....................... 324/166 |

*Primary Examiner*—John S. Heyman
*Assistant Examiner*—Karl Ohralik
*Attorney, Agent, or Firm*—Lowe, Price, LeBlanc Becker and Shur

[57] ABSTRACT

A pulse counting device wherein a number of pulses is stored in a first register out of a plurality of registers, and subsequently a new pulse number counted is stored in the first register and pulse numbers stored in the registers are successively shifted with a pulse number erased from a final register. The pulse numbers stored in the respective registers are corrected dependent on the latest pulse number stored in the first register, and a value dependent on the corrected values stored in all of the registers is displayed. If the latest pulse number is abruptly varied in excess of a certain preset value upon comparison with the pulse numbers in the registers, then the pulse numbers in the registers are corrected with a value dependent on the latest pulse number. If the latest pulse number is varied gradually within the preset value upon comparison with the pulse numbers in the registers, then the pulse numbers in all of the registers are compared to correct the pulse numbers in prescribed registers into a certain sequence of numbers. With this arrangement, a display unit of the pulse counting device has a quick response with respect to variations in the latest pulse number.

3 Claims, 6 Drawing Figures

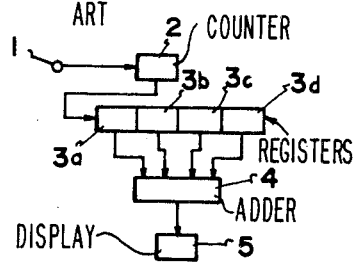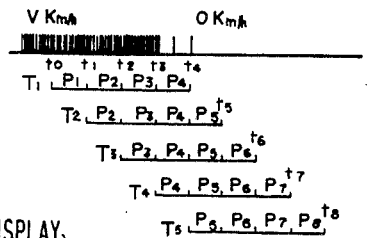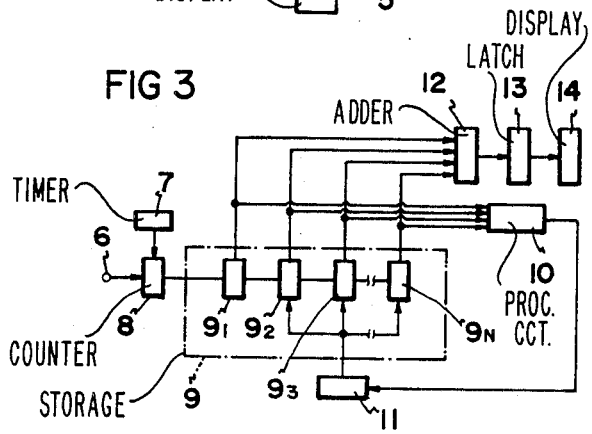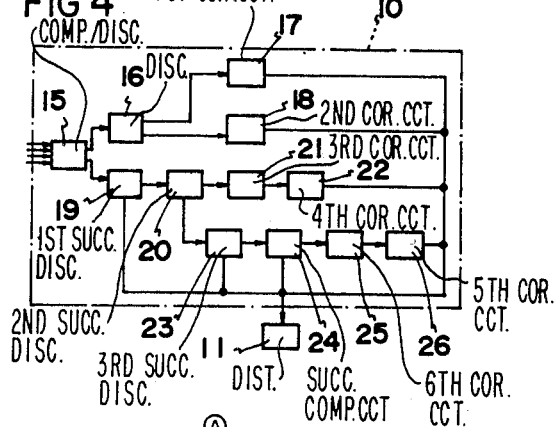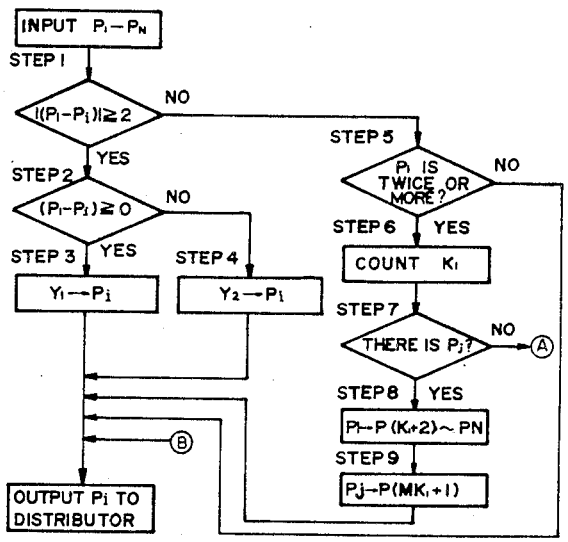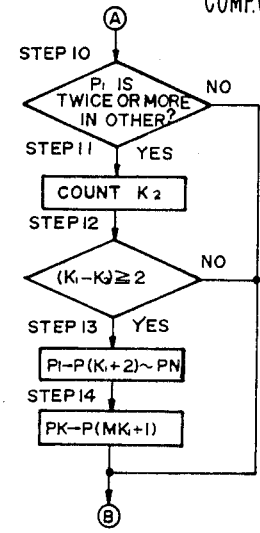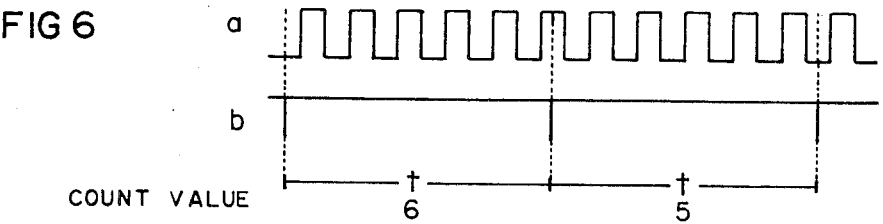

PULSE COUNTING AND PULSE RATE INDICATING DEVICE RESPONSIVE TO ABRUPT PULSE RATE CHANGE TO ACCURATELY INDICATE CURRENT RATE

BACKGROUND OF THE INVENTION

1. Field of the Invention

The present invention relates to a pulse counting device for counting a pulse signal generated in relation to a variation in a measurand such as the running speed or the number of engine r.p.m. of automobiles or motorcycles.

2. Description of the Prior Art

There are generally known devices for displaying a measurand based on pulses produced in proportion to the measurand. The known devices operate by counting the pulses proportional to the measurand with a gate time preset by a reference clock signal, latching the count, and successively updating and displaying the count. In the prior devices, a time in which the count can be updated is determined by setting the gate time preset by the reference clock signal, and the measurement accuracy is governed by the density of pulses applied as an input within the gate time. Generally, however, a higher density of pulses proportional to variations in the measurand requires a considerably more expensive pulse generator. Even if the pulse generator is provided inexpensively, the number of pulses generated in a clock period when the automobile or motorcycle is running at high speed, require a counter capacity to be increased, with the result that the device is quite large in overall size and expensive. It would easily be possible to increase the gate time to relatively increase the number of pulses applied in the gate time. However, this method would fail to follow a rapid change in the measurand.

One general arrangement is shown in FIG. 1 of the accompanying drawings. As shown in FIG. 1, when pulses proportional to a variation in a measurand are applied to an input terminal 1, the pulses are counted by a counter 2 connected to the input terminal 1 and having a counting period. When the counting operation of the counter 2 is completed, counts from the counter 2 are stored in a plurality of, e.g., four registers 3a, 3b, 3c, 3d, and the counts stored in the registers 3a . . . 3d are added by an adder 4 which produces a sum P. A value dependent on the sum P is then displayed on a display 5.

Operation of the circuit arrangement illustrated in FIG. 1 will be described with reference to FIG. 2. When pulses proportional to a variation in a measurand such as a running speed are applied from the input terminal 1, pulse numbers P1, P2, P3, P4 counted periodically at times in which the display in a display unit 5 is switched to display a new value which may be 1 second for example, are stored respectively in the registers 3d, 3c, 3b, 3a at times t1, t2, t3, t4 when the counter 2 finishes pulse counting. The stored pulse numbers P1, P2, P3, P4 are added by the adder 4, and a running speed dependent on the sum (P1+P2+P3+P4) is displayed on display unit 5.

If the running speed is abruptly reduced to 0 km/h at t4, then a pulse number P5=0 counted in a new display switching time t4-t5 is newly applied to the counter 3a at a count completing time t5, and the pulse numbers P4, P3, P2 stored in the registers 3a, 3b, 3c are successively shifted into the registers 3b, 3c, 3d, respectively. The pulse number P1 counted in the oldest display switching time t0-t1 is shifted out of the registers. A running speed dependent on the sum (P2+P3+P4+0) given by the adder 4 is displayed on the display unit 5. Therefore, the display still indicates a certain speed value notwithstanding the running speed is 0 km/h in reality.

At a next count completing time t6, a pulse number P6=0 counted in a new display switching time t5-t6 is newly entered into the register 3a, and the pulse numbers P5, P4, P3 stored in the registers 3a, 3b, 3c are successively shifted into the registers 3b, 3c, 3d respectively. The pulse number P2 counted in the oldest display switching time t1-t2 is shifted out of the registers. A running speed dependent on the sum (P3+P4+0+0) given by the adder 4 is displayed on the display unit 5. Therefore, the display still indicates a certain speed value notwithstanding the running speed is 0 km/h in reality.

At a next count completing time t7, the pulse numbers P3 through P6 stored in the registers 3a through 3b are shifted, and the pulse number P3 counted in the oldest display switching time t2-t3 is shifted out of the registers. A pulse number P7=0 counted in a new display switching time t6-t7 is newly entered into the register 3a. A running speed dependent on the sum (P3+0+0+0) given by the adder 4 is displayed on the display unit 5, the displayed value being not yet 0 km/h.

At a count completing time t8, the pulse numbers P4 through P7 stored in the registers 3a through 3d are shifted, and the pulse number P4 counted in the oldest display switching time t3-t4 is shifted out of the registers. A pulse number P8=0 counted in a new display switching time t7-t8 is newly entered into the register 3a, whereupon the sum of the registers 3a through 3d becomes (0+0+0+0) and the running speed as displayed on the display unit 5 is 0 km/h.

With a speedometer employing the above conventional pulse counting device, four counting times (or four seconds in the example) are required before the displayed value actually indicates 0 km/h after the motor vehicle has stopped. The speedometer is therefore disadvantageous in that its response is slow and the displayed speed value is different from an actual speed felt by the driver.

SUMMARY OF THE INVENTION

It is an object of the present invention to provide a pulse counting device capable of improving a response upon a rapid change in the number of pulses by dividing a gate time into a plurality of sections, counting pulses generated dependent on a measurand, determining the number of pulses in the gate time, correcting the number of pulses counted in the gate time with a change in the number of pulses, and displaying a numerical value dependent on the corrected pulse number.

According to the present invention, there is provided a pulse counting device wherein a gate in which to count pulses generated dependent on a variation in a measurand is divided into a plurality of sections, a number of pulses counted in each gate time section is stored in a first register out of a plurality of registers, and a new pulse number counted subsequently is stored in the first register and pulse numbers stored in the registers are successively shifted with a pulse number erased from a final register each time one gate time section elapses, thereby displaying a value dependent on the stored values in all of the registers, the pulse counting device comprising: comparator and discriminator means for determining whether the latest pulse number stored in the first register is abruptly changed as compared with the pulse numbers stored in the other registers; means for rewriting the content of a prescribed register with a prescribed value if the latest pulse number is determined by the comparator and discriminator means as being abruptly changed; and means for rewriting the content of a prescribed register into a certain sequence of numbers through comparison of the pulse numbers in all of the registers if the latest pulse number is determined by the comparator and discriminator means as being not abruptly changed and if the latest pulse number is successively stored in other registers including the first registers and a value other than the latest pulse number is successively stored in registers, the arrangement being such that a value will be displayed dependent on the stored values in all of the registers after having been corrected as the measurand with the latest pulse number in the first register being given major importance.

The above and other objects, features and advantages of the present invention will become more apparent from the following description when taken in conjunction with the accompanying drawings in which a preferred embodiment of the present invention is shown by way of illustrative example, and like reference characters designate like parts throughout.

BRIEF DESCRIPTION OF THE DRAWINGS

FIG. 1 is a block diagram of a conventional pulse counting device;

FIG. 2 is a diagram illustrative of operation of the conventional pulse counting device;

FIG. 3 is a block diagram of a pulse counting device according to the present invention;

FIG. 4 is a block diagram of a processing circuit in the pulse counting device of FIG. 3;

FIG. 5 is a flowchart showing progressive steps of operation of the processing circuit of FIG. 4; and FIG. 6 is a diagram illustrative of pulse counting operation.

DESCRIPTION OF THE PREFERRED EMBODIMENT

In FIG. 3, pulses generated dependent on a measurand in a speed detector (not shown) are applied to an input terminal 6. A timer 7 presets a time in which to count the pulses applied to the input terminal 6, the counting time being of a value obtained by dividing a gate time by any desired integer. In the illustrated embodiment, the counting time is selected to be 1/N of the gate time. A counter 8 serves to count the pulses fed through the input terminal 6 within the preset counting time. A storage section 9 is composed of a plurality of registers for storing the number of pulses counted by the counter 8. The number of the registers in the storage section 9 is equal to the quotient obtained by dividing the gate time by the counting time, the number of the registers being N in this embodiment. Each time the counting time elapses, the pulse number counted by the counter 8 is applied to a first register $9_1$ as a latest pulse number for the storage section 9, and pulse numbers stored in registers $9_1, 9_2, \ldots 9_{(N-1)}$ are successively shifted into registers $9_2, 9_3, \ldots 9_N$, whereupon the pulse number stored in the register $9_N$ is erased from the storage section 9. The values stored in the registers are applied to a processing circuit 10, described later, each time the pulse number is applied. The processing circuit 10 compares the latest pulse number applied in the register $9_1$ in the gate time with the previous pulse numbers stored in the other registers $9_2$ through $9_N$ to determine abrupt changes, or increases or decreases, in the pulse number and issue a command for correcting the pulse numbers stored in the registers $9_2$ through $9_N$ based on the determined results. In response to the corrective command, a distributor 11 rewrites the pulse numbers in the registers $9_2$ through $9_N$ and stores the rewritten pulse numbers in the registers $9_2$ through $9_N$. Thereafter, the pulse numbers in the registers $9_2$ through $9_N$ are added by an adder 12, a latch circuit 13 is driven for display, and a display unit 14 displays a numerical value dependent on an output value from the adder 12.

The construction of the processing circuit 10 will be described with reference to FIG. 4.

The pulse numbers stored in the registers $9_1$ through $9_N$ are processed in such a manner that the pulse number $P_1$ from the register $9_1$ is compared with the pulse numbers $P_i$ (i=2 ... N) from the registers $9_2 \ldots 9_N$ by a comparator and discriminator circuit 15. If $|(P_1-P_i)| \geq X$ (X is a certain preset value), then a positive-negative discriminator circuit 16 determines whether $(P_1-P_i)$ is positive or negative, and enables a first correction command circuit 17 or a second correction command circuit 18 to issue a command to rewrite and correct the pulse numbers from the registers $9_2-9_N$ with a certain prescribed value. The rewriting and correcting command for the registers $9_2 \ldots 9_N$ is transferred to the distributor 11 which is responsive to the command for rewriting the values stored in the registers $9_2 \ldots 9_N$. If $|(P_1-P_i)| <X$ as determined by the comparator and discriminator circuit 15, then a first succession number discriminator circuit 19 which is a first discriminator means determines whether the pulse number $P_1$ is successively present two times or more in the registers $9_1 \ldots 9_N$, including the register $9_1$, and counts a succession number $K_1$. A second succession number discriminator circuit 20 determines whether there are successive values other than the pulse number $P_1$ in the pulse numbers stored in the registers $9_2 \ldots 9_N$.

Based on the results from the first and second succession number discriminator circuits 19, 20, a third correction command circuit 21 issues a command to rewrite and correct at least one of the pulse numbers in the registers $9_2 \ldots 9_N$ into the pulse number $P_1$ stored in the register $9_1$. A fourth correction command circuit 22 issues a command to rewrite and correct a prescribed pulse number in the registers $9_2 \ldots 9_N$ into a value other than the successive pulse number $P_1$, and transfers the command to the distributor 11.

A third succession number discriminator circuit 23 which is a second discriminator means determines whether the pulse number $P_1$ is successively present once or more in registers other than successive registers including the register $9_1$ and other than successive registers including the final register $9_N$, and counts a succession number $K_2$. A succession number comparator circuit 24 which is a comparator means compares the succession numbers $K_1, K_2$ to determine if $(K_1-K_2) \geq 2$. If $(K_1-K_2) \geq =2$, then a fifth correction command circuit 25 issues a command to rewrite and correct a prescribed pulse number in the registers $9_2 \ldots 9_N$ into the pulse number $P_1$, and a sixth correction command circuit 26 issues a command to rewrite and correct a prescribed pulse number in the registers $9_2 \ldots 9_N$ into a value other than the pulse number $P_1$, and delivers the command to the distributor 11. The fifth and sixth correction command circuits 25, 26 jointly serve as a means for correcting a value in a register other than the first register.

Operation of the pulse counting device thus constructed will be described further with reference to the flowchart of FIG. 5.

Pulses applied from the input terminal 6 are counted by the counter 8, and the count is applied to the register $9_1$ upon elapse of a time interval equal to 1/N of the gate time. The pulse number applied to the register $9_1$ is shifted successively in the registers $9_2$ through $9_N$ each time the 1/N time elapses. The pulse numbers in the registers $9_1 \ldots 9_N$ are delivered to the comparator and discriminator circuit 15 in the processing circuit 10. The comparator and discriminator circuit 15 compares the pulse number $P_1$ from the register $9_1$ with the pulse numbers $P_i$ (i= 2 ... N) from the registers $9_2 \ldots 9_N$ to determine if the difference between $P_1$ and $P_i$ is greater than the preset value X, that is, if $|(P_131\ P_i)| \geq X$ in a step 1. The preset value X is assumed here to be "2" for illustrative purpose. If $|(P_1-P_i)| \geq 2$ in at least one register $9_i$, then the positive and negative discriminator circuit 16 determines whether $(P_1-P_i)$ is positive or negative in a step 2. If $(P_1-P_i)$ is positive, then the latest pulse number $P_1$ applied to the register $9_1$ is greater than the pulse number $P_i$ in the other register $9_i$, that is, the latest pulse number has a tendency to increase. Conversely if $(P_1-P_i)$ is negative, then the latest pulse number has a tendency to decrease. At the time $(P_1-P_i)$ is positive, the first correction command circuit 17 issues a command to rewrite the pulse numbers $P_2 \ldots P_N$ with a prescribed value $Y_1$ in a step 3 to correct the pulse numbers $P_i$ in the registers $9_2 \ldots 9_N$ so as to approach the pulse number $P_1$ in the register $9_1$ which is fed with the latest pulse number. The prescribed value $Y_1$ may be of the latest pulse number $P_1$ or "$P_1-1$", but is "$P_1-1$" in this embodiment. When $(P_1-P_i)$ is negative, the second correction command circuit 18 issues a command to rewrite the pulse numbers $P_2 \ldots gN_n$ with a prescribed value $Y_2$ in a step 4 to correct the pulse numbers $P_i$ in the registers $9_2$-$P_N$ so as to approach the pulse number $P_1$ in the register $9_1$ which is fed with the latest pulse number. The prescribed value $Y_2$ may be of the latest pulse number $P_1$ or "$P_1+1$", but is "$P_1+1$" in this embodiment. The pulse numbers $P_i$ in the registers $9_2 \ldots 9_N$ for which the first and second correction command circuit 17 or 18 has issued a correction command are corrected by the distributor 11, and transferred to the registers $9_2 \ldots 9_N$. Then, the pulse numbers in the registers $9_1 \ldots 9_N$ are added by the adder 12, the latch circuit 13 is driven, and thereafter a numerical value dependent on the sum is displayed on the display unit 14.

The routine in the steps 1 through 4 is effective to enable the display unit 14 to display a value closest to the latest pulse number when the pulse number is abruptly changed. The prescribed values Y1, Y2 are selected to be $P_1 \pm 1$ for the reason that since a next latest pulse number applied to the register $9_1$ cannot be predicted, the response of the display unit 14 to the latest pulse number $P_1$ applied currently to the register $9_1$ should be increased while preventing an undershoot (the displayed value on the display unit 14 is smaller than the actual value) or an overshoot (the displayed value is greater than the actual value).

If $|(P_1-P_i)| < 2$ in the step 1, then the first succession number disoriminator circuit 19 determines in a step 5 whether the pulse number $P_1$ in the register $9_1$ is successively present two times or more in the pulse numbers $P_2 \ldots P_N$ in the other registers $9_2 \ldots 9_N$, including the register $P_1$. If the pulse number $P_1$ is successively present twice or more, then the number $K_1$ of successive occurrences is counted in a step 6. Then, where the pulse number $P_1$ is successively present twice or more, the second succession number discriminator circuit 20 determines in a step 7 whether there is a value $P_j$ other than the pulse number $P_1$, which is successively present in the registers $9_2 \ldots 9_N$. If there is $P_j$ which is successively present twice or more in the pulse numbers $P_2 \ldots P_N$, then the third correction command circuit 21 issues a command to rewrite the pulse numbers $P_{(K1+2)} \ldots P_N$ in the registers $9_{(K1+2)} \ldots 9_N$ with the pulse number $P_1$ in a step 8. Then, the fourth correction command circuit 22 issues a command to rewrite the pulse number $P_{(MK1+1)}$ in the register $9_{(K1+1)}$ with the pulse number $P_j$ in a step 9 (M=2, 3, ... N). The routine of the steps 5 through 9 is followed at the time when no abrupt change is present with respect to the latest pulse number $P_1$ as compared with the pulse numbers $P_2 \ldots P_N$, but the frequency of the input pulses is not constant (that is, the numbers of successive input pulses are not regular). In such an instance, the pulse numbers $P_1 \ldots P_N$ are rewritten into a certain sequence of numbers dependent on the latest pulse number $P_1$, so that the pulse number $P_1$ is given a major importance while taking into account the pulse numbers $P_2 \ldots P_N$ storing the conditions prior to the pulse number $P_1$ for thereby displaying a value as close as possible to the actual value. The pulse numbers $P_2 \ldots P_N$ for which the rewriting command is issued in the steps 8 and 9 are rewritten by the distributor 11, transferred to the registers $9_2 \ldots 9_N$, and then controlled for display on the display unit 14.

If there is no other successive values than the pulse number $P_1$ in the step 7, then the third succession number discriminator circuit 23 determines in a step 10 whether the pulse number $P_1$ is successively present once or more in registers other than successive registers including the register $9_1$ and other than successive registers including the register $9_N$. If the pulse number $P_1$ is successively present, the number $K_2$ of successive occurrences is counted in a step 11. Then, the succession number comparator circuit 24 determines in a step 12 whether the succession number $K_1$ is greater than the succession number $K_2$ by 2 or a larger number. If $(K_1-K_2) \geq 2$, then the fifth correction command circuit 25 issues a command to rewrite the pulse numbers in the registers $9_{(K1+2)} \ldots 9_N$ with the pulse number $P_1$ in a step 13. Furthermore, the sixth correction command circuit 26 issues a command to rewrite the pulse numbers in the register $9_{(MK1+1)}$ with a value $P_K$ other than the pulse number $P_1$ in a step 14 (M=2, 3, ... N). Since $|(P_1-P_i)| > 2$ in the step 1, there are only the latest pulse number $P_1$ and the other one pulse number $P_K$ in the operation of the steps 10 through 14, with $P_K$ being uniquely determined. The operation of the steps 10 through 14 is followed when no abrupt change is present with respect to the latest pulse number $P_1$ as compared with the pulse numbers $P_2 \ldots P_N$, but the frequency of the input pulses is not constant (that is, the numbers of successive input pulses are not regular), and the latest input pulses $P_1$ are successively stored and in a somewhat steady condition. In this case, the values of the pulse numbers $P_2 \ldots P_N$ are rewritten into a certain sequence of numbers with the latest pulse number $P_1$ and the number of successive occurrences thereof, so that the latest pulse number $P_1$ and the number of successive occurrences thereof are given a major importance while taking into account the pulse numbers $P_2 \ldots P_N$ storing the prior conditions, thus displaying a value close to the actual value more speedily. The pulse numbers $P_2 \ldots P_N$ for which the rewriting command has been issued in the steps 13 and 14 are rewritten by the distributor 11, transferred to the registers $9_2 \ldots 9_N$, and then controlled for display on the display unit 14.

If the answer is "NO" in the steps 5, 10, 12, then it is determined that the latest pulse number $P_1$ is not subjected to an abrupt change as compared with the other pulse numbers and the frequency of the input pulses is not determined as being not constant. Therefore, the pulse numbers are not rewritten, but transferred to the registers $9_2 \ldots 9_N$, and controlled for display on the display unit 14.

The above operation will be described more specifically with reference to Tables.

The operation of the steps 1 through 9 will be described with reference to Table 1:

TABLE 1

| t | Content of registers $9_1 \ldots + 9_8$ | Rewritten content of registers $9_1 \ldots + 9_8$ | Displayed value B | Conventional displayed value C |
|---|---|---|---|---|
| t0 | 00000000 | | 0 | 0 |
| t1 | 20000000 | 21111111 | 9 | 2 |
| t2 | 42111111 | 43333333 | 25 | 6 |
| . | . | . | . | . |
| . | . | . | . | . |
| . | . | . | . | . |
| t11 | 02122121 | 01111111 | 7 | 11 |
| . | . | . | . | . |
| . | . | . | . | . |
| t12 | 11010100 | 11010101 | 5 | 4 |
| . | . | . | . | . |
| . | . | . | . | . |
| t31 | 10011010 | | 4 | 4 |

Table 1 shows contents of the eight registers $9_1 \ldots 9_8$ in which input pulse numbers counted each time 1/8, for example, of the gate time has elapsed are successively shifted and stored, contents of the registers having been rewritten by the processing circuit 10 and the distributor 11, displayed values B dependent on the stored contents of the rewritten registers, and conventional displayed values C which have not been rewritten.

At an initial condition t0, "0" is stored in each of the registers $9_1 \ldots 9_8$, and the displayed values are "0".

At a count time t1, "2" is applied as an input pulse to the register $9_1$. It is actually preferable to display "16" which is 8 times "2" of the register $9_1$ supplied with the latest pulse number, or a value close to "16", though "2" is displayed in the conventional example. According to the embodiment of the invention, the comparator and discriminator circuit 15 determines the differences between the latest pulse number $P_1$ and the other stored pulse numbers $P_i$ (i=2 through 8). If the comparator and discriminator circuit 15 finds that at least one of the determined differences exceeds the preset value X (X=2 in the embodiment), then the positive and negative discriminator circuit 16 determines that the input pulse number has a tendency to increase as the latest pulse number is larger than the other pulse number, and the first correction command circuit 17 issues a command to rewrite the pulse numbers $P_2 \ldots P_8$ with the prescribed value $Y_1$ ($Y_1=P_1-1$ in the embodiment)=1. Therefore, since the displayed value B is "9" after having been rewritten, a value which is close to the current preferred displayed value "16" is displayed.

When "4" is applied as the latest pulse number $P_1$ to the register $9_1$ at a count time t2, the pulse numbers $P_2 \ldots P_8$ are rewritten with $Y_1-P_1=1=4-1=3$ in the same manner as at the count time t1, and the displayed value B becomes "25". The preferred displayed value at this time is "32" which is 8 times "4", though the conventional displayed value C becomes "6" if not rewritten at t1. In the embodiment, therefore, a value close to the preferred value can be displayed.

At a count time t11, "0" is applied as the latest pulse number $P_1$ to the register $9_1$. At this time, the comparator and discriminator circuit 15 determines that at least one of the differences between the latest pulse number $P_1$ and the other pulse numbers $P_2 \ldots P_8$ exceeds the preset value X of "2", and the positive and negative discriminator circuit 16 determines that the difference is negative. Therefore, the second correction command circuit 18 issues a command to rewrite the pulse numbers $P_2 \ldots P_8$ with the prescribed value $Y_2$ ($Y_2=P_1+1$ in the embodiment)=1. As a result, the rewritten displayed value B becomes "7". Since the preferred value is "0" and the conventional displayed value C is "11", a value close to the preferred value can be displayed according to the embodiment. The above operation indicates that the subsequent pulse numbers tend to decrease since the latest pulse number $P_1$ exceeds the preset value X and is smaller than at least one of the other pulse numbers $P_2 \ldots P_8$.

At a count time t21, "1" is applied as the latest pulse number $P_1$ to the register $9_1$, and the comparator and discriminator circuit 15 determines that all of the differences between the latest pulse number $P_1$ and the other pulse numbers $P_2 \ldots P_8$ fall within the preset value X. This indicates that as the latest pulse number $P_1$ does not widely differ from the previously stored pulse numbers $P_2 \ldots P_8$, the subsequence pulse numbers do not tend to increase or decrease, but are substantially in the steady condition. However, the first succession number discriminator circuit 19 determines that the latest pulse number $P_1$ "1" is successively present twice and the succession number $K_1$ is "2", and the second succession number discriminator circuit 20 determines that a value "0" other than the pulse number $P_1$ is successively present twice. Therefore, the frequency of the input pulses is determined as being not constant. Even in this case, the pulse numbers $P_2 \ldots P_N$ in the registers $9_2-9_N$ should preferably rewritten into a certain sequence of numbers dependent on $P_1$. Accordingly, the third correction command circuit 21 issues a command to rewrite the registers $9_{(2+2)} \ldots 9_8$ with "1". Furthermore, the fourth correction command circuit 22 issues a command to rewrite the registers $9_{(2M+1)}$ (M=2, 3, 4, ... N), that is, the registers $9_5$ and $9_7$ with a successive value "0" other than the pulse number $P_1$. The pulse numbers in the registers $9_2 \ldots 9_8$ are repeated with a sequence of numbers having a certain order of [1·0]. That is, where the input pulse numbers have a substantially steady tendency, the displayed values are subjected to such a tendency even when the latest pulse number applied taking into account the stored previous pulse numbers is somewhat varied. In this case, the displayed value B is "5", and the preferred displayed value is "8" which is 8 times "1" judging only for the pulse number $P_1$, and is substantially in the steady condition, with the pulse numbers previously stored containing many "0"s. Judging from these data, the preferred displayed value is smaller than "8". Therefore, the displayed value B of "5" in the embodiment is close to the preferred value.

At a count time t31, "1" is applied as the latest pulse number $P_1$ to the register $9_1$, and the comparator and discriminator circuit 15 determines that all of the differences between the latest pulse number $P_1$ and the other pulse numbers $P_2 \ldots P_8$ fall within the preset value X. The first succession number discriminator circuit 19 determines that the pulse number $P_1$ is not successively present twice or more, including $P_1$. In this case, it is determined that the latest pulse number is not abruptly changed and the frequency of the input pulses is not constant, and there is no need for rewriting the register contents, so that the value is displayed as it is.

The operation of the steps 10 through 14 will be described with reference to Table 2:

TABLE 2

| t | Content of registers $9_1 \ldots + 9_{12}$ | Content of rewritten registers $9_1 \ldots + 9_{12}$ |
|---|---|---|
| t41 | 111211212121 | |
| t42 | 111121212121 | 111121112111 |
| t43 | 111112112111 | 111112111121 |
| t44 | 111111211112 | 111111211111 |
| t45 | 111111121111 | |

Normally, the number of registers required for counting and storing pulses dependent on variations in a measurand such as a running speed of an automobile ranges from 10 to 20. The reason for the many registers is that the switching time per each of the divided gate times is short and display switching per display operation on the display unit 14 is rapid, resulting in an increased accuracy. The operation of the steps 10 through 14 is effective when the number of registers used is increased. Table 2 shows contents of the twelve registers $9_1 \ldots 9_{12}$ in which an input pulse number counted each time 1/12, for example, of the gate time has elapsed are successively shifted and stored, and contents of the registers which have been rewritten by the distributor 11.

At a count time t41, "1" is applied as the latest pulse number $P_1$ to the register $9_1$, and the comparator and discriminator circuit 15 determines that all of the differences between the pulse number $P_1$ and the other pulse numbers $P_2 \ldots P_{12}$ falls within the preset value X (X=2). The first succession number discriminator circuit 19 determines that the pulse number $P_1$ of "1" is successively present twice or more and the succession number $K_1$ is "3", the second succession number discriminator circuit 20 determines that a value other than the pulse number $P_1$ is not successively present twice or more, and the third succession number discriminator circuit 23 determines whether the pulse number $P_1$ of "1" is successively present once or more in a register other than successive registers including the register $9_1$ and other than successive registers including the registers $9_N$. Since "1" is successively present twice in the registers $9_5$, $9_6$, the succession number $K_2$ is "2". The succession number comparator circuit 24 compares the succession numbers $K_1$ and $K_2$ to find that $(K_1-K_2)=1$. Therefore, the succession number $K_1$ of the pulse number $P_1$ including the register $9_1$ and the succession number $K_2$ of the pulse number $P_1$ not including the register $9_1$ are not widely different from each other, so that there is no need for rewriting the values of the registers into a certain sequence of numbers, and no corrective command is delivered to the distributor 11.

At a count time t42, "1" is applied as the latest pulse number $P_1$ to the register $9_1$. The same aspects of operation as those at the count time t41 will not be described hereinbelow. The first succession number discriminator circuit 19 determines that the succession number $K_1$ of the pulse number $P_1$ is "4", and the third succession number discriminator circuit 23 determines that the succession number $K_2$ is "2". In this case, the succession number is determined as "2" in the registers $9_6$ and $9_7$, and as "1" in the registers $9_9$ and $9_{11}$, but a minimum value is employed here as the succession number $K_2$. The succession number comparator circuit 24 determines that $(K_1-K_2)=3$. This is because the succession number $K_1$ of the pulse number $P_1$ including the register $9_1$ and the succession number $K_2$ of the pulse number $P_1$ not including the register $9_1$ are different from each other, and the contents of the registers can be brought closely to newly applied pulse numbers by rewriting the values of the registers $9_2 \ldots 9_{12}$ into a certain sequence of numbers. To this end, the fifth correction command circuit 25 issues a command to rewrite the registers $9_{(4+2)} \ldots 9_{12}$ with the latest pulse number $P_1$ or "1". Furthermore, the sixth correction command circuit 26 issues a command to rewrite the register $9_{(4M+1)}$ (M=2, 3 ... N) with a value $P_K$ of "2" other than the pulse number $P_1$. In this case, the value other than the pulse number $P_1$ is only one and uniquely determined. Since the pulse numbers $P_1 \ldots P_{12}$ after having been rewritten are a succession of [1·1·1·2] which is a sequence of numbers, an updated value can be displayed taking into consideration the newer pulse numbers of the registers $9_1 \ldots 9_5$.

Likewise, at a count time t43, the succession number $K_1$ becomes "5" and the succession number $K_2$ becomes "3". Therefore, the registers $9_{(5+2)} \ldots 9_{12}$ are rewritten with "1" and the register $9_{(10+2)}$ is rewritten with "2". As a consequence, the pulse numbers $P_1 \ldots P_{12}$ having been rewritten are a succession of [1·1·1·1·2] which is a sequence of numbers.

When "1" is applied to the register $9_1$ at a next count time t44, the succession number $K_1$ becomes "6" and the succession number $K_2$ becomes "4". The registers $9_{(6+2)} \ldots 9_{12}$ are rewritten with "1". The pulse numbers $P_1 \ldots P_{12}$ having been rewritten are a succession of [1·1·1·1·1·2] which is a sequence of numbers.

When "1" is applied to the register $9_1$ at a next count time t45, the succession number $K_1$ becomes "7" and four "1"s are successively present in the registers $9_9 \ldots 9_{12}$ and the difference between the two succession numbers is 2 or more, a condition which would appear to require rewriting in the foregoing manner. However, where the pulse number $P_1$ is successive including the final register $9_{12}$, there pulse numbers $P_{(N+1)}$, $P_{(N+2)}$, shifted from the register $9_{12}$ out of the registers 9 and hence erased from storage could possibly be "1". Therefore, determination based on the current stored values in the registers 9 results in lack of accuracy when considered in a long time span. In the case where the latest pulse number $P_1$ is successive including the final register $9_{12}$, failure to forcibly rewrite the registers is more preferable to let a past history of data. Thus, succession number $K_2$ is determined only where the latest pulse number $P_1$ does not include the registers $9_1$ and $9_{12}$.

At the count times t42, t43, t44 and the like, the succession numbers of the pulse numbers $P_1$ or "1" stored in the rewritten registers $9_1 \ldots 9_{12}$ are different by "1" in such a manner that at the count time t42, for example, the pulse numbers $P_1$ are present four times in the registers $9_1 \ldots 9_4$ and the pulse numbers $P_1$ are present three times in the registers $9_6 \ldots 9_8$. Since as shown in FIG. 6 an input pulse signal a is not synchronous with a gate signal b having divided gate times, there is produced one count difference at maximum dependent on the phase relationship of the signals a, b upon counting even if there is no variation in the frequency of the input pulse signal a. Consequently, the input pulse numbers can be regarded as constant even with the foregoing count times.

With the present invention, as described above, the latest pulse number applied is employed as main data, and the previously stored pulse numbers are corrected dependent on the sequence of the previously stored pulse numbers, so that the displayed value can respond quickly with respect to an abrupt change in the gate time, thus greatly reducing any difference between the actual speed felt by the driver and the displayed speed value.

The preset value X set by the comparator and discriminator circuit 15 and serving as a reference for determining any abrupt change in the input pulse number can be selected as desired. The prescribed values Y ($Y_1$, $Y_2$) determined by the first and second correction command circuits 17, 18 may be $P_1$ rather than "$P_1 \pm 1$", or may be a combination of both. The number of registers to be rewritten may be preset or all or some of the registers $9_1 \ldots 9_N$ may be selected dependent on the result of determination from the comparator and discriminator circuit 15.

In the foregoing embodiment, the register to be rewritten by the third and fifth correction command circuits 21, 25 and the register to be rewritten by the fourth and sixth correction command circuits 22, 26, for correcting the pulse numbers in the registers $9_2 \ldots 9_N$ into a certain sequence of numbers are (K1+2)th and (MK1+1)th registers. However, such a process is merely illustrative, and other processes may be utilized.

As described above in detail, the present invention provides a pulse counting device for counting and displaying a number of pulses applied as an input in a gate time, the gate time being divided into a plurality of sections to count the input pulses so that the number of pulses counted in the gate time is corrected dependent on a variation in the input pulse in the gate time and the corrected pulse number is displayed, with the result that the pulse counting device has a quick display response with respect to any abrupt variation in the input pulses.

Although a certain preferred embodiment has been shown and described, it should be understood that many changes and modifications may be made therein without departing from the scope of the appended claims.

What is claimed is:

1. A pulse counting device wherein a gate time in which to count pulses generated dependent on a variation in a measurand is divided into a plurality of gate time sections, a number of pulses counted in each gate time section is stored in a first register out of a plurality of registers, and a new pulse number counted subsequently is stored in said first register and pulse numbers stored in the registers are successively shifted with a pulse number erased from a final register each time one gate time section elapses, for displaying a value dependent on the stored values in all of the registers, said pulse counting device comprising: comparator and discriminator means for determining whether the latest pulse number stored in said first register is abruptly changed as compared with the pulse numbers stored in the other registers of said plurality of registers; means for rewriting the content of at least one register with a prescribed value if the latest pulse number is determined by said comparator and discriminator means as being abruptly changed; and means for rewriting the content of a prescribed register into a certain sequence of registers through comparison of the pulse numbers in all of said registers if the latest pulse number is determined by said comparator and discriminator means as being not abruptly changed and if the latest pulse number is successively stored in said other registers and said first register and a value other than the latest pulse number is successively stored in registers, the arrangement being such that a value will be displayed dependent on the stored values in all of the registers after having been corrected as the measurand with the latest pulse number in said first register being given major importance.

2. A pulse counting device according to claim 1, including first discriminator means for determining whether said latest pulse number is successively stored in registers including said first register and also determining a first number of successive occurrences of the latest pulse number if the latest pulse number is determined by said comparator and discriminator means as being not abruptly changed as compared with the pulse numbers stored in the other registers, as being stored successively in said other registers and said first register, and as being stored successively in a further sequence of registers other than the successive registers including said first register, second discriminator means for determining whether said latest pulse number is successively stored in registers other than the successive registers including said first register and also determining a second number of successive occurrences of the latest pulse number, comparator means for determining the difference between said first and second numbers, and means for correcting the values in the registers other than said first register based on the result of comparison by said comparator means, whereby the values stored in the registers can be corrected dependent on a number of successive occurrences of the latest pulse number.

3. In a pulse counting device having a plurality of successive registers for storing a plurality of pulse numbers detected in successive gate time sections and a combining means for combining the stored numbers in the registers to provide an output number for display on a display means, the improvement comprising:

comparing means for comparing a value of a pulse number most recently stored in one of said registers provided for storing the most recent pulse number with other numbers previously stored in others of said plurality of registers, for determining whether the most recently stored pulse number represents a change in excess of a predetermined value from the previously stored other numbers and for outputting a signal indicative thereof, changing means responsive to said comparing means for changing numbers stored in at least one of said other registers in accordance with the most recently stored pulse number if said comparing means outputs a signal indicative of a change in excess of said predetermined value, thereby providing to said combining means a set of stored numbers more closely representative of the most recently stored pulse number when the most recently stored pulse number represents an abrupt change from previously stored pulse numbers, so that the output number displayed on said display means more closely represents a current value of a measurand represented by said pulse numbers under situations of abrupt change, said pulse counting device further comprising frequency comparing means for comparing lengths of sequences of numbers stored in said plurality of registers with a length of a sequence of the most recently input pulse number, for determining whether the most recently stored pulse number represents a change in frequency of the input pulse numbers in excess of a predetermined value and for outputting a signal indicative thereof, said changing means being further responsive to said comparing means for changing numbers stored in at least one of said other registers in accordance with the most recently stored pulse number if said comparing means outputs a signal indicative of a change in frequency of input numbers in excess of said predetermined value, thereby providing to said combining means a set of stored numbers more closely representative of the most recently stored pulse number when the frequency of the most recently stored pulse number represents a change from the frequency of previously stored pulse numbers, so that the output number displayed on said display means more closely represents a current value of the measurand represented by said pulse numbers under situations of changing frequencies.

* * * * *